United States Patent
Fåhraeus et al.

(10) Patent No.: US 6,947,033 B2
(45) Date of Patent: Sep. 20, 2005

(54) METHOD AND SYSTEM FOR DIGITIZING FREEHAND GRAPHICS WITH USER-SELECTED PROPERTIES

(75) Inventors: Christer Fåhraeus, Lund (SE); Linus Wiebe, Mälmo (SE)

(73) Assignee: Anoto AB, Lund (SE)

( * ) Notice: Subject to any disclaimer, the term of this patent is extended or adjusted under 35 U.S.C. 154(b) by 419 days.

(21) Appl. No.: 09/812,882

(22) Filed: Mar. 21, 2001

(65) Prior Publication Data

US 2002/0008721 A1 Jan. 24, 2002

Related U.S. Application Data

(60) Provisional application No. 60/207,882, filed on May 30, 2000.

(30) Foreign Application Priority Data

Mar. 21, 2000 (SE) .............................. 0000945

(51) Int. Cl.[7] ................................................ G09G 5/00
(52) U.S. Cl. ...................... 345/175; 345/156; 345/162; 345/173; 345/179
(58) Field of Search ................................ 345/156–157, 345/162, 173, 175, 179

(56) References Cited

U.S. PATENT DOCUMENTS

| | | | |
|---|---|---|---|
| 4,717,793 A | | 1/1988 | Kobayashi |
| 5,194,852 A | * | 3/1993 | More et al. ................. 345/182 |
| 5,502,568 A | * | 3/1996 | Ogawa et al. ............... 356/620 |
| 5,546,528 A | * | 8/1996 | Johnston ...................... 345/807 |
| 5,555,369 A | | 9/1996 | Menendez et al. |
| 5,572,251 A | * | 11/1996 | Ogawa .................. 348/207.99 |
| 5,652,412 A | | 7/1997 | Lazzouni et al. |
| 5,815,142 A | * | 9/1998 | Allard et al. ................ 345/173 |
| 5,852,434 A | * | 12/1998 | Sekendur ..................... 345/179 |
| 5,963,199 A | * | 10/1999 | Kato et al. ................... 345/179 |
| 6,061,052 A | * | 5/2000 | Raviv et al. ................. 345/180 |
| 6,249,606 B1 | * | 6/2001 | Kiraly et al. ................ 382/195 |
| 6,507,345 B1 | * | 1/2003 | Tojo ........................... 345/473 |

FOREIGN PATENT DOCUMENTS

| | | |
|---|---|---|
| EP | 0615209 | 9/1994 |
| WO | WO 99/50787 | 10/1999 |
| WO | WO 0073983 | 12/2000 |
| WO | WO 0116691 | 3/2001 |
| WO | WO 0126032 | 4/2001 |

* cited by examiner

*Primary Examiner*—Matthew C. Bella
*Assistant Examiner*—Po-Wei Chen
(74) *Attorney, Agent, or Firm*—Birch, Stewart, Kolasch & Birch, LLP

(57) ABSTRACT

Disclosed is a method for inputting graphical information into a computer system. The graphical information may arise when a drawing device is moved relative to a base having a position-coding pattern detectable by an optical sensor in the drawing device. The computer system may record position information arising from a first area of the base as graphical input while recording position information arising from a second area of the base as the selection of a property associated with the graphical input. Such a property may be a visual property, such as line type, line thickness, and color.

39 Claims, 3 Drawing Sheets

METHOD AND SYSTEM FOR DIGITIZING FREEHAND GRAPHICS WITH USER-SELECTED PROPERTIES

CROSS-REFERENCE TO RELATED APPLICATIONS

This application claims priority benefits based on Swedish Patent Application No. 0000945-6, filed Mar. 21, 2000, and U.S. Provisional Application No. 60/207,882, filed May 30, 2000, the technical disclosures of both of which are hereby incorporated herein by reference.

FIELD OF THE INVENTION

The invention relates generally to computer input methods and, more specifically, to methods for inputting freehand graphics.

BACKGROUND OF THE INVENTION

Methods for inputting graphical information into computers may be used to a great extent with various types of graphics programs, presentation programs, CAD programs, Web design programs, and the like. Such graphical information may be hand-drawn.

Input systems for entering freehand graphics may include a base and a drawing device. When the drawing device is moved over the base, the movement of the drawing device may be recorded electronically as graphical input that may be transmitted to a computer system in digital form. In one such input system, the base may inductively detect the position of the drawing device relative to the base. By repeated recordation of this information, the movement of the drawing device across the base can be tracked and the corresponding image determined.

Known input systems may often be expensive. They may also be unwieldy, particularly if the base has a large input surface and a palette to choose visual properties for the graphical inputs. Such limitations may prevent the use of such input systems in mobile applications.

SUMMARY OF A FEW ASPECTS OF THE INVENTION

Generally described, the invention may include a system for digitizing a freehand (i.e., hand drawn) graphic. The system may include a base having a surface (divided into a first area and a second area) and, on the surface, a position-coding pattern detectable by an optical sensor. The system may also include a drawing device having an optical sensor functional to detect a position in the position-coding pattern. Moreover, the system may include a microprocessor adapted (perhaps with computer software containing appropriate instructions) to perform the following actions: determining if the position detected by the optical sensor is in the first area or the second area; if the position is in the first area of the surface, then interpreting the position as a point in the freehand graphic; and if the position is in the second area of the surface, then interpreting the position as a selection of a property for the freehand graphic.

The invention may also include a base enabling the digitization of a freehand graphic. The base may have a surface and, on the surface, a position-coding pattern detectable by an optical sensor. The surface may include both a first area and a second area visually distinct from the first area.

Moreover, the invention may include a computer program for digitizing a freehand graphic. The program may receive a position indicator detected on a position-coding pattern by an optical sensor as the optical sensor moves over a surface. The program may then determine if a position corresponding to the position indicator lies in a first area of the surface and, if the position lies in the first area, interpret the position as defining part of the freehand graphic. The program may also determine if the position corresponding to the position indicator lies in a second area of the surface and, if the position lies in the second area, determine a property for the freehand graphic.

Additionally, the invention may include a computer program for digitizing a freehand graphic. The program may receive from an optical sensor an indicator of a position in a selection area of a position-coding pattern. The program may then determine a visual property mapped to the position in the selection area. Until a new indicator of a position in the selection area of the position-coding pattern is received, the program may apply the visual property to portions of the freehand graphic thereafter drawn by movement of the optical sensor over a drawing area of the position-coding pattern.

The foregoing summarizes only a few aspects of the invention and is not intended to be reflective of the full scope of the invention as claimed. Additional features and advantages of the invention are set forth in the following description, may be apparent from the description, or may be learned by practicing the invention. Moreover, both the foregoing general description and the following detailed description are exemplary and explanatory and are intended to provide further explanation of the invention as claimed.

DETAILED DESCRIPTION OF PREFERRED EMBODIMENTS

Figure 1:
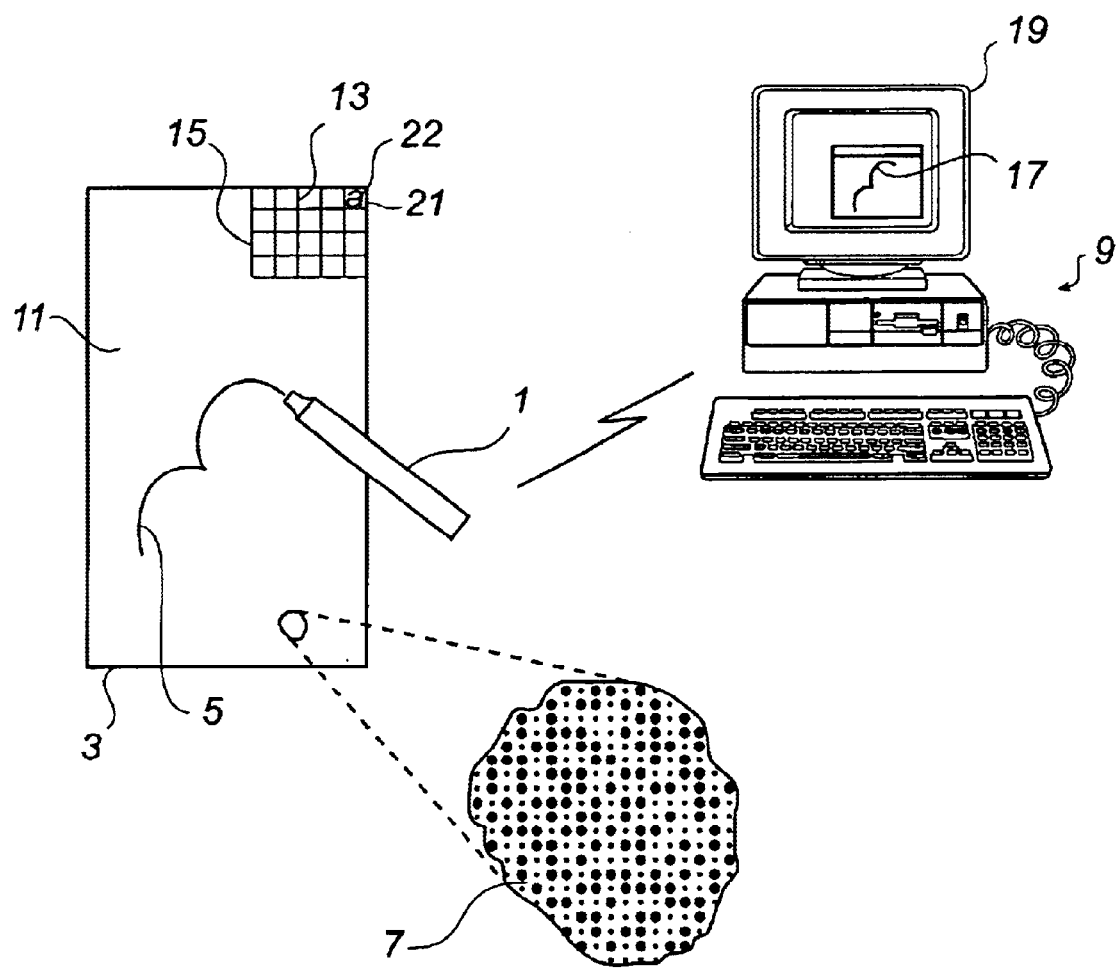
FIG. 1 illustrates a system for inputting freehand graphical information in accordance with an exemplary embodiment of the present invention.

Generally described, the invention may include a method for inputting graphical information into a computer system. The graphical information may arise when a drawing device is moved relative to a base (or surface) having a position-coding pattern detectable by an optical sensor in the drawing device. The computer system may record position information arising from a first area of the base as graphical input while recording position information arising from a second area of the base as the selection of a property associated with the graphical input. Such a property may be a visual property, such as line type, line thickness, and color.

In an exemplary embodiment, a user may move the drawing device over a sub-area of the second area of the base, thereby selecting the property associated with that sub-area. The computer system may then apply the selected property to some or all portions of a freehand graphic that the user then creates by moving the drawing device over the first area (a drawing area) of the base. In fact, the computer system may continue applying a selected property to any portions of a freehand graphic drawn until selection of a new property, at which point the computer system may thereafter apply the new property to portions of the freehand graphic created after selection of the new property. Alternatively, the computer system may apply a selected property to some or all portions of a freehand graphic that the user has drawn before selection of the property.

FIG. 1 shows a system that may be used for inputting graphical information in accordance with an exemplary embodiment of the present invention. The system may include a drawing device 1 that a user may move over a base 3. As the user does this, the drawing device 1 may deposit an ink trace 5, perhaps of ink, on the base 3, though this is not necessary. The base 3 may be made of an easily erasable material, permitting reuse of the base 3.

A position-coding pattern 7 (shown enlarged) may be printed on the base. The position-coding pattern 7 may be designed so that if part of the pattern with a certain minimum size is recorded, the corresponding position on the base can be determined unambiguously.

The applicant's Patent Applications WO 00/73983 and PCT/SE00/01895, the technical disclosures of each of which are hereby incorporated herein by reference, disclose a suitable position-coding pattern 7. As these applications teach, each position may be coded by a number of symbols and a symbol may be used to code a number of positions. Also relevant is Patent Application WO/01/16691, the technical disclosure of which is also hereby incorporated herein by reference.

The position-coding pattern 7 shown may be constructed as taught by WO 00/73983, where a large dot represents a "one" and a small dot represents a "zero." But the position-coding pattern 7 may also be as described in PCT/SE00/01895, where different displacements of a dot in relation to a raster point code different symbol values.

The drawing device 1 may use an optical sensor to detect the position-coding pattern 7 and, thereby, the corresponding positions on the surface of the base. When the drawing device 1 moves relative to the base 3 and in contact with the base, the drawing device may record a series of positions on the base 3. The drawing device 1 may then transmit this position information to a microprocessor for interpretation. The microprocessor may be included in a computer system 9, such as a personal computer or a server at a remote location across a network. Alternatively, the microprocessor may be included in a cellular telephone or the drawing device 1 itself.

Transmission of the position information may occur through various types of cable, an infrared link, or a short-range radio link (such as one defined by the BLUETOOTH protocol). Position information may be transmitted as a set of pairs of coordinates or as a polygon train into which such coordinates have been converted.

In one embodiment, the drawing device 1 may generate the position information by movement over a base 3 with a position-coding pattern 7. It then may transmit the position information to a personal computer for processing. Or the personal computer may forward the position information over a network to a server for interpretation.

The drawing device 1 may assign detected positions a time-stamp. This enables the order of graphical inputs to be preserved.

The base 3 may have a first area 11 (a drawing area) and a second area 13 (for choosing properties of the graphical objects drawn in the drawing area). The first area 11 and the second area 13 may be visually separated, perhaps with a printed line 15.

The computer system 9 may have a computer program to interpret position information recorded by the drawing device 1. If the drawing device 1 deposits a trace 5 by moving over the base 3 while in contact with the base, the computer system 9 may record the position information as graphical input 17 because the trace occurred in the first area 11 (drawing area). The graphical input 17 corresponding to the trace 5 may be displayed on the monitor 19 and digitally stored.

In the digitization process, a position recorded within the first area 11 may be stored as a "one," whereas non-activated pixels may be represented by a "zero." Once digitized, a graphical image may be transmitted over a network, perhaps via an e-mail attachment. By storing a time-stamp corresponding to when the drawing device 1 records each position, the system may also be able to reproduce the manner in which a drawing formed.

The computer system 9 may interpret position information recorded by the drawing device 1 while touching the second area 13 as the selection of a visual property for the graphical input created by moving the drawing device over the first area (drawing area) 11. For example, after creating and recording a graphical input 17, the user may point with the drawing device 1 to a sub-area 21 in the second area 13 and thereby assign to the graphical input 17 a property (such as the color blue) associated with this sub-area 21. The order may also be reversed, permitting the user to select a property for the graphical object 17 before creating the object. A sub-area 21 representing a visual property may be provided with a visible, visual indicator 22 indicating the associated property.

The computer system 9 (or, alternatively, a microprocessor capable of performing its functionality) may also be integrated into the drawing device 1. This may enable the drawing device to create a complete graphic image and then transmit it, perhaps by way of a mobile telephone system. The microprocessor for interpreting position information (i.e., determining which positions define the graphic and which select properties for the graphic) may also be incorporated into a mobile telephone.

Figure 2:
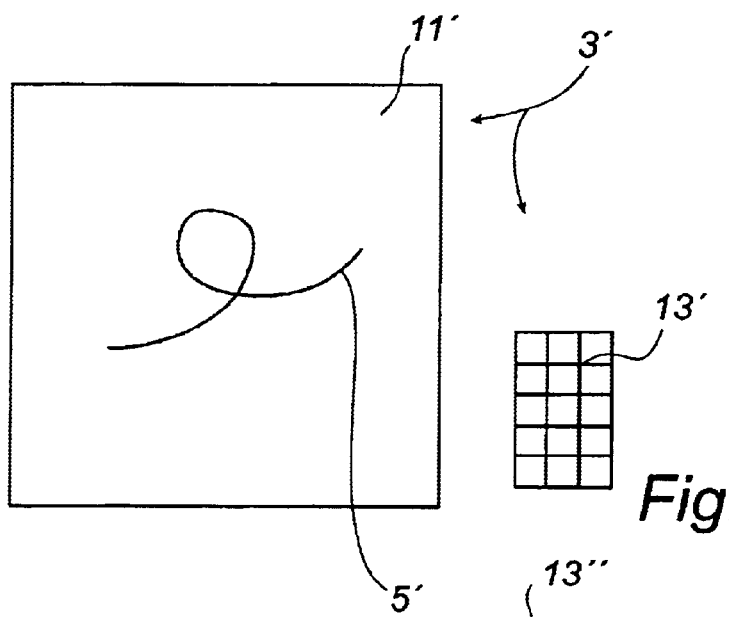
FIG. 2 illustrates a base, with a palette for choosing graphical properties, that is physically separate from the drawing area in accordance with an exemplary embodiment of the present invention.

FIG. 2 shows an alternative embodiment of a base 3'. The base 3' may have a first area 11' and a second area 13'. The first area 11' and the second area 13' may be physically separate units. The first area 11' may enable creation of graphical inputs as a drawing device 1 creates an ink trace while moving over its position-coding pattern. The second area 13' may be used to assign visual properties to the graphical inputs.

When a visual property is chosen, an indication of the selected property may be displayed to the user to confirm the user's property choice. If, for instance, the user chooses the visual property "blue," a personal computer in communication with the drawing device 1 may then display the word "blue" on its monitor. If the drawing device 1 communicates with a cellular telephone, a display on this telephone may likewise display an indication of the property selected. Alternatively, a display on the drawing device itself could achieve this functionality.

Figure 3:
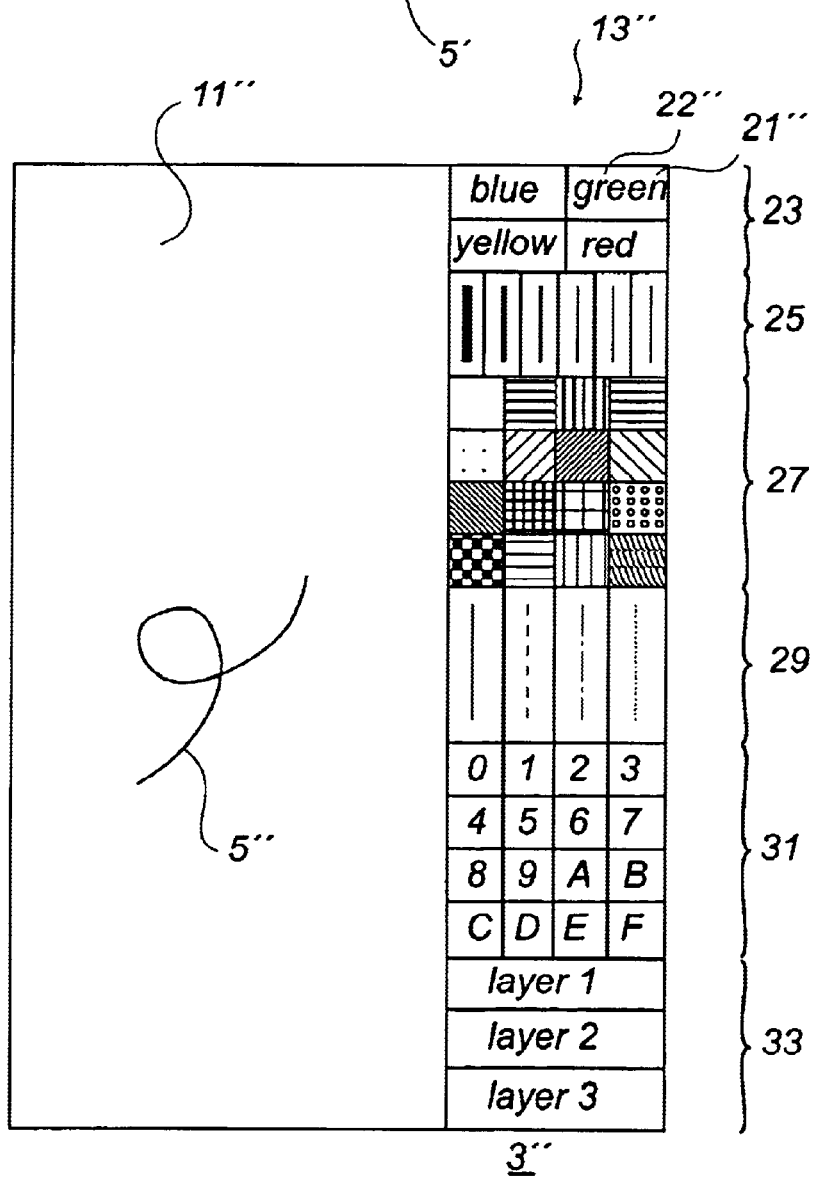
FIG. 3 illustrates a base enabling the input of freehand graphics in yet another exemplary embodiment of the present invention.

FIG. 3 shows a further embodiment of a base 3" in accordance with an exemplary embodiment of the present invention. The base may be a sheet of paper, an inexpensive solution. It may instead be a synthetic material such as polymer, allowing ink markings on the surface to be erased easily.

The base 3" may have a position-coding pattern, as well as a first area 11" and a second area 13". The first area 11" may enable creation of graphical inputs via production of a trace 5" over the position-coding pattern. The second area 13" may enable assignment of visual properties to the graphical inputs.

The second area 13" may have a number of divisions 23, 25, 27, 29, 31, 33, each containing a number of sub-areas 21". Each sub-area 21" may comprise a set of positions defined by the position-coding pattern. When a computer system in the arrangement detects any of these positions, the position may be interpreted as selection of the visual property corresponding to this sub-area 21".

A visual property may be color information. The area 13" of the base 3" may have a first division 23 and a third division 27 to enable the selection of color information. The sub-areas within the first division 23 are printed with alphanumeric indicators 22" signifying the colors represented by the sub-areas, in this case the color names. The sub-areas in the third division 27 have been colored with the colors (shown here by shading) they represent, providing a language-independent user interface.

The second division 25 may in a similar way represent selectable line thickness properties, and the fourth division 29 may represent line type properties. Typical line types may include solid, dotted, and broken lines.

In FIG. 3, there is shown 16 separate sub-areas in division 31, each labeled with a numeral 0 to 9 or a letter A to F. By pointing at a sequence of these characters, the user can input an arbitrarily long code corresponding to a particular visual property. In this way, a small surface can provide for selection of a large number of properties.

A virtual keyboard (not shown) of letters A to Z (and a to z) and numbers may be provided on the area 13". When the drawing device points at the sub-area corresponding to such a letter or number, the corresponding letter or number may be inserted in the message. A user may use such a virtual keyboard to specify, for example, an e-mail address, a fax number, or a keyword.

The sub-areas of division 33 may specify the layer in which a graphical input is to be deposited in a drawing. Applying graphical inputs on different layers may prove useful in many applications. For instance, a machine drawing may be completed in a first layer and legends explaining features of the machine may be placed in a second layer. In this way, a user may be able to choose whether or not to display the legends. Different recipients may also be sent different sets of layers. It is also possible to assign different properties (e.g., line width or line color) to different layers.

Visual properties other than those already discussed may be available in other embodiments of the present invention. For example, a graphical input may be assigned a "text" property, making the system apply OCR (Optical Character Recognition) to the input. Text may also be given specific effects (such as "bold" or "italic") when such properties are offered in a property area.

Drawing tools may also be provided by selecting "buttons" in the area 13. For example, selecting the "circle" button may permit the user to draw a circle by only specifying a center and a radius in the drawing area. Other button functions may permit deletion of specific objects, deletion of all objects, and "undo" (deletion of the last object drawn).

Figure 4:
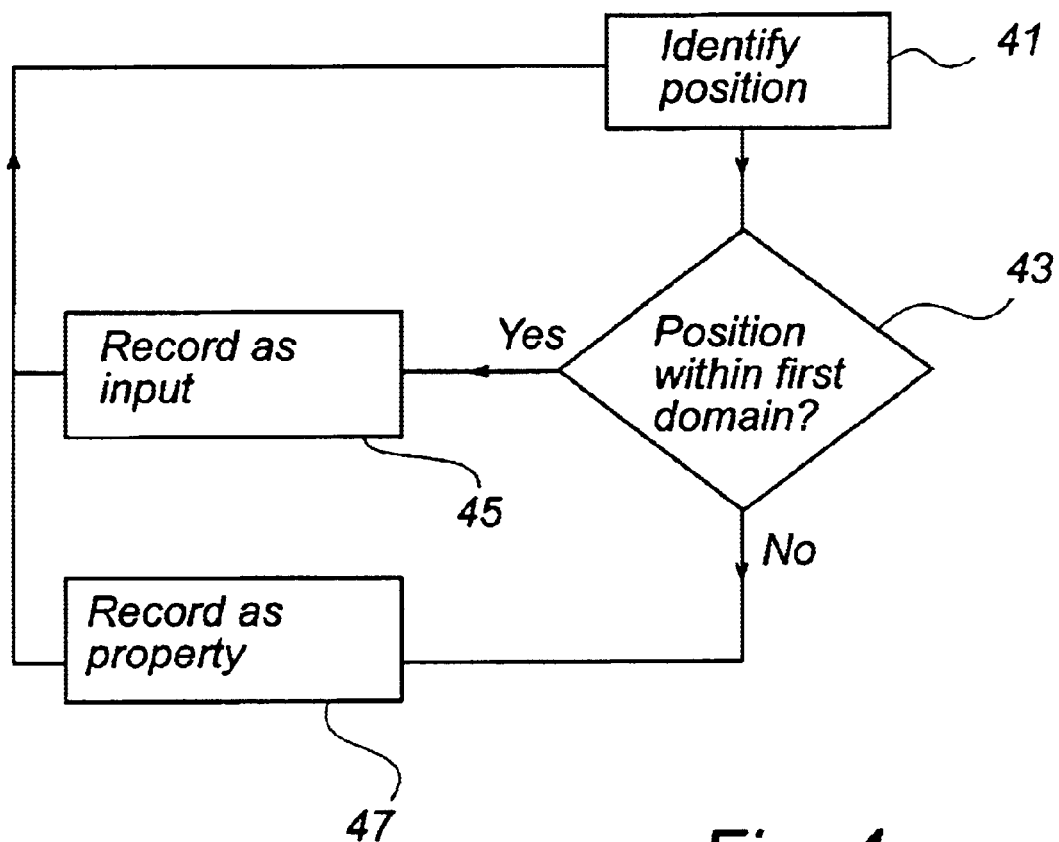
FIG. 4 is a flow chart illustrating steps by which a computer program may process input generated by a writing device moved over a base having a position-coding pattern in accordance with an exemplary embodiment of the present invention.

FIG. 4 is a flow chart illustrating the steps in a computer program encompassing an exemplary embodiment of the present invention. The program may be stored on any digital storage medium (for example a diskette). By using the computer program to instruct a microprocessor to carry out these steps, the microprocessor may be adapted to perform embodiments of the invention.

The method begins in step 41. After receiving a position location in step 41 (perhaps from a drawing device deriving it from a position-coding pattern using an optical sensor), the program determines in step 43 if the position lies in the first area 11 of the base. If the position lies in the first area 11 of the base, then the "YES" branch is followed to step 45, and the program interprets and records the position as graphical input. If the position does not lie in the first area 11 of the base, then the "NO" branch is followed from step 43 to step 47, and the program interprets and records the position as a property to be associated with the graphical input. Both step 45 and step 47 loop back to step 41, where the program can receive further position information for processing.

The scope of the patent protection applied for is not restricted to the embodiments described above. The invention can be varied and changed in a number of ways within the scope of the following claims.

Concurrently filed with the application for this patent are applications entitled Systems and Methods for Information Storage based on Swedish Application No. 0000947-2, filed Mar. 21, 2000, and U.S. Provisional Application No. 60/207, 839, filed May 30, 2000; Secured Access Using a Coordinate System based on Swedish Application No. 0000942-3, filed Mar. 21, 2000, and U.S. Provisional Application No. 60/207, 850 filed on May 30, 2000; System and Method for Printing by Using a Position Coding Pattern based on Swedish Application No. 0001245-0, filed on Apr. 5, 2000, and U.S. Provisional Application No. 60/210,651, filed on Jun. 9, 2000; Apparatus and Methods Relating to Image Coding based on Swedish Application No. 0000950-6, filed on Mar. 21, 2000, and U.S. Provisional Application No. 60/207,838, filed on May 30, 2000; Apparatus and Methods for Determining Spatial Orientation based on Swedish Application No. 0000951-4, filed on Mar. 21, 2000, and U.S. Provisional Application No. 60/207,844, filed on May 30, 2000; System and Method for Determining Positional Information based on Swedish Application No. 0000949-8, filed Mar. 21, 2000, and U.S. Provisional Application No. 60/207,885, filed on May 30, 2000; Method and System for Transferring and Displaying Graphical Objects based on Swedish Application No. 0000941-5, filed Mar. 21, 2000, and U.S. Provisional Application No. 60/208,165, filed May 31, 2000; Online Graphical Message Service based on Swedish Application No. 0000944-9, filed Mar. 21, 2000, and U.S. Provisional Application No. 60/207,881, filed May 30, 2000; Method and System for Digitizing Freehand Graphics With User-Selected Properties based on Swedish Application No. 0000945-6, filed Mar. 21, 2000, U.S. Provisional Application No. 60/207,882, filed May 30, 2000; Data Form Having a Position-Coding Pattern Detectable by an Optical Sensor based on Swedish Application No. 0001236-9, filed Apr. 5, 2000, and U.S. Provisional Application No. 60/208,167, filed May 31, 2000; Method and Apparatus for Managing Valuable Documents based on Swedish Application No. 0001252-6, filed Apr. 5, 2000, and U.S. Provisional Application No. 60/210,653 filed Jun. 9, 2000; Method and Apparatus for Information Management based on Swedish Application No. 0001253-4 filed Apr. 5, 2000, and U.S. Provisional Application No. 60/210,652, filed Jun. 9, 2000; Device and Method for Communication based on Swedish Application No. 0000940-7, filed Mar. 21, 2000, and U.S. Provisional Application No. 60/208,166, filed May 31, 2000; Information-Related Devices and Methods based on Swedish Application No. 0001235-1, filed Apr. 5, 2000, and U.S. Provisional Application No. 60/210,647, filed Jun. 9, 2000; Processing of Documents based on Swedish Application No. 0000954-8, filed Mar. 21, 2000, and U.S. Provisional Application No. 60/207,849, filed May 30, 2000; Secure Signature Checking System based on Swedish Application No. 0000943-1, filed Mar. 21, 2000, and U.S. Provisional Application No. 60/207,880, filed May 30, 2000; Identification of Virtual Raster Pattern, based on Swedish Application No. 0001235-1, filed Apr. 5, 2000, and U.S. Provisional Application No. 60/210,647, filed Jun. 9, 2000, and Swedish Application No. 0004132-7, filed Nov. 10, 2000, and U.S. Provisional Application No. 60/261,123, filed Jan. 12, 2001; and a new U.S. Provisional Application entitled Communications Services Methods and Systems.

The technical disclosures of each of the above-listed U.S. applications, U.S. provisional applications, and Swedish applications are hereby incorporated herein by reference. As used herein, the incorporation of a "technical disclosure" excludes incorporation of information characterizing the related art, or characterizing advantages or objects of this invention over the related art.

In the foregoing Description of Preferred Embodiments, various features of the invention are grouped together in a single embodiment for purposes of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Description of the Preferred Embodiments, with each claim standing on its own as a separate preferred embodiment of the invention.

What is claimed is:

1. A system for digitizing a freehand graphic, the system comprising:
    a base including:
        a surface;
        a position-coding pattern fixed to the surface and detectable by an optical sensor;
        a first area of the surface; and
        a second area of the surface;
    a drawing device having an optical sensor functional to detect a position in the position-coding pattern; and
    a microprocessor adapted to perform the following actions:
        determining if the position detected by the optical sensor is in the first area or the second area;
        if the position is in the first area of the surface, then interpreting the position as a point in the freehand graphic; and
        if the position is in the second area of the surface, then interpreting the position as a selection of a property for the freehand graphic.

2. The system of claim 1, wherein the drawing device includes the microprocessor.

3. The system of claim 1, wherein the microprocessor resides externally of the drawing device.

4. The system of claim 1, further comprising a cellular phone, and wherein the cellular phone includes the microprocessor.

5. The system of claim 1, further comprising a display to indicate a property selected from the second area.

6. The system of claim 1, wherein said position-coding pattern is printed on said surface of said base.

7. A base enabling the digitization of a freehand graphic, the base comprising:
    a surface;
    a position-coding pattern fixed to the surface and detectable by and optical sensor;
    a first area of the surface; and
    a second area of the surface visually distinct from the first area, wherein the second area includes a plurality of visually distinct sub-areas, and at least one of the sub-areas comprises an indication of a property for a freeform graphic.

8. The base of claim 7, wherein the second area is physically separated from the first area.

9. The base of claim 7, wherein the second area includes a plurality of visually distinct sub-areas.

10. The base of claim 7, wherein the second area includes a plurality of visually distinct sub-areas, and at least one of the sub-areas comprises a label representing a property for a freeform graphic.

11. The base of claim 7, wherein the second area includes a plurality of visually distinct sub-areas, and at least one of the sub-areas comprises an indication of a color for a freeform graphic.

12. The base of claim 7, wherein the second area includes a plurality of visually distinct sub-areas, and at least one of the sub-areas comprises an indication of a line thickness for a freeform graphic.

13. The base of claim 7, wherein the second area includes a plurality of visually distinct sub-areas, and at least one of the sub-areas comprises an indication of a type of line for a freeform graphic.

14. The base of claim 7, wherein the second area includes a plurality of visually distinct sub-areas, and at least one of the sub-areas comprises an indication of a layer for deposition of a freeform graphic.

15. The base of claim 7, wherein said position coding pattern is printed on said surface of said base.

16. A drawing device for digitally creating a freeform graphic, the drawing device comprising:
    an optical sensor for detecting a position in a position-coding pattern fixed to a surface; and
    a microprocessor adapted to perform the following actions:
        determining if the position detected by the optical sensor is in a first area of the surface;
        if the position is in the first area, then interpreting the position as a point in the freehand graphic;
        determining if the position detected by the optical sensor is in a second area of the surface; and
        if the position is in the second area, then interpreting the position as a selection of a property for the freehand graphic.

17. The drawing device of claim 16, wherein the microprocessor is further adapted to assign a time-stamp to the position detected by the optical sensor.

18. The drawing device of claim 16, wherein the microprocessor is further adapted to determine an order in which the position was detected relative to other positions detected by the optical sensor.

19. The drawing device of claim 16, wherein said position coding pattern is printed on said surface.

20. A method for digitizing a freehand graphic, the method comprising:
    receiving a position indicator detected on a position-coding pattern fixed to a surface by an optical sensor as the optical sensor moves over the surface;

determining if a position corresponding to the position indicator lies in a first area of the surface;

if the position lies in the first area, then interpreting the position as defining part of the freehand graphic;

determining if the position corresponding to the position indicator lies in a second area of the surface; and if the position lies in the second area, then determining a property for the freehand graphic.

21. The method of claim 20, further comprising assigning a time-stamp to the position corresponding to the position indicator.

22. The method of claim 20, further comprising determining an order in which the position indicator was detected relative to other positions detected by the optical sensor.

23. The method of claim 20, wherein determining a property for the freehand graphic comprises:

determining a sub-area of the second area in which the position lies; and determining that the property for the freehand graphic comprises a property represented by the sub-area.

24. The method of claim 20, further comprising if the position lies in the second area, then displaying a portion of the freehand graphic drawn after determining the property for the freehand graphic in visual accordance with the property.

25. The method of claim 20, further comprising if the position lies in the second area, then after determining the property for the freehand graphic, applying the property determined to all portions of the freehand graphic created until a new property for the freehand graphic is selected.

26. The method of claim 20, further comprising if the position lies in the second area, then displaying a portion of the freehand graphic drawn before determining the property for the freehand graphic in visual accordance with the property.

27. The method of claim 20, wherein the property is selected from the group consisting of color, line thickness, line type, and layer.

28. A computer-readable medium having computer-executable instructions for performing the method of claim 20.

29. A computer system adapted to perform the method of claim 20.

30. The method of claim 20, wherein said position coding pattern is printed on a surface to be read by said optical sensor.

31. A method for digitizing a freehand graphic, the method comprising:

receiving from an optical sensor an indicator of a position in a selection area of a position-coding pattern fixed to a surface;

determining from a plurality of visual properties a visual property mapped to the position in the selection area; and until a new indicator of a position in the selection area of the position-coding pattern is received, applying the visual property to portions of the freehand graphic thereafter drawn by movement of the optical sensor over a drawing area of the position-coding pattern.

32. The method of claim 31, further comprising displaying an indication of the visual property when it is being applied.

33. A computer-readable medium having computer-executable instructions for performing the method of claim 31.

34. The method of claim 31, wherein said position coding pattern is printed on a surface to be read by said optical sensor.

35. A base enabling the digitization of a freehand graphic, the base comprising:

a surface;

a position-coding pattern fixed to the surface and detectable by an optical sensor;

a first area of the surface;

a second area of the surface having no overlap with the first area;

the second area having a plurality of sub-areas; and at least one of the plurality of sub-areas having a visual indicator representing specific information a user can submit to a computer system by moving a drawing device including the optical sensor over the at least one of the plurality of sub-areas.

36. The base of claim 35, wherein the visual indicator comprises at least one alphanumeric symbol.

37. The base of claim 35, wherein the plurality of sub-areas are visually separated.

38. The base of claim 35, wherein the specific information comprises an ASCII code corresponding to the visual indicator.

39. The base of claim 35, wherein said position coding pattern is printed on said surface of said base.

* * * * *